May 11, 1954     D. C. GERBER     2,677,869
FILTER FABRIC AND METHOD OF MAKING SAME
Original Filed Sept. 3, 1947

*INVENTOR:*
DALE C. GERBER
BY
ATTORNEY

Patented May 11, 1954

2,677,869

UNITED STATES PATENT OFFICE 2,677,869

FILTER FABRIC AND METHOD OF MAKING SAME

Dale C. Gerber, North Canton, Ohio, assignor to The Hoover Company, North Canton, Ohio, a corporation of Ohio Original application September 3, 1947, Serial No. 771,967. Divided and this application May 2, 1951, Serial No. 224,174

8 Claims. (Cl. 26—3)

This application is a division of my copending application for Letters Patent, Serial No. 771,967, filed September 3, 1947, which is now Patent No. 2,576,717 directed to a suction cleaner filter.

The present invention relates to filters and more particularly to filters composed of fibrous material having exterior fibers removed.

In the usual filter for suction cleaners the material has a matted napped surface to which the dirt adheres and prevents removal of the dirt when the filter is cleaned, and as a result when the filter is re-used the back pressure becomes excessive and reduces the cleaning efficiency of the suction cleaner. The present invention provides a filter fabric wherein the matted napped surface is removed to form a smooth surface upon which the dirt initially contacts, and the smooth surface functions to cause the easy removal of the dirt deposited thereon when the filter is cleaned. Removal of the matted napped surface does not injure the fibers in the body portion of the filter material and thus the filtering efficiency of the material is not reduced.

An object of the invention is to provide a filter formed from fibrous material. Another object is to provide a fibrous filter having projecting fibers shortened while retaining the necessary filtering characteristics. A further object is to provide a fibrous filter adapted for use with a suction cleaner and having the fibers in the dirt contacting surface shortened to form a smooth dirt collecting surface which can be easily cleaned. Another object is to provide a method and apparatus for shortening fibers projecting from the body of a fibrous filter material. Still another object is to provide a method and apparatus for treating fibrous filtering material by subjecting the material to an electrical charge to raise fibers from the body of the material and thereafter shortening the fibers by singeing the latter to substantially the body of the material. Other objects and advantages of the invention will be apparent from the following specification and drawings, wherein:

Figure 3:
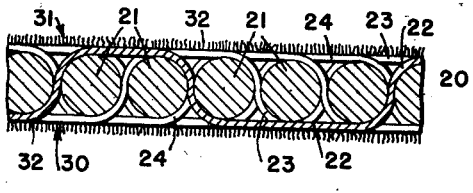
Figure 3 is a section of the filter material prior to shortening the fibers.

The invention herein disclosed is for purposes of illustration applied to a suction cleaner comprising a casing 10 supported on runners 11 and having a suction end cap 12 and an exhaust end cap 13. The end cap 12 is provided with an inlet 14 for connection to an unshown hose and cleaning tool which engages a surface to be cleaned, and the rear end cap 13 has an outlet 15 which can also be provided with a cleaning tool in a manner well known in the art. A dirt filtering bag 16 is supported in the casing 10 to remove the dirt from the dirt-laden air passing through the inlet 14 into the bag, and a motor-fan unit 17 provides the suction for moving the air stream and exhausting it through the outlet 15. The filter material may be paper, cloth or other suitable material and as shown in Figure 3 prior to being processed is a single ply cloth 20 having yarns 21 secured together by warp face yarns 22, 23, and 24. The exposed surfaces 30 and 31 of the material prior to being processed is a mass of intermingled matted fibers or nap 32, and it is these fibers which retain the dirt in the usual suction cleaner bag and prevent removing all of the dirt when the bag is being cleaned.

Figure 1:
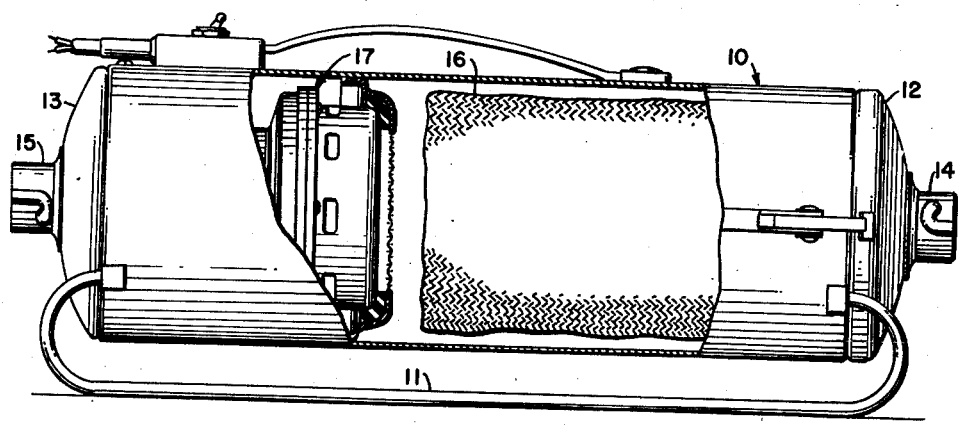
Figure 1 illustrates the filter in a suction cleaner.
Figure 2:
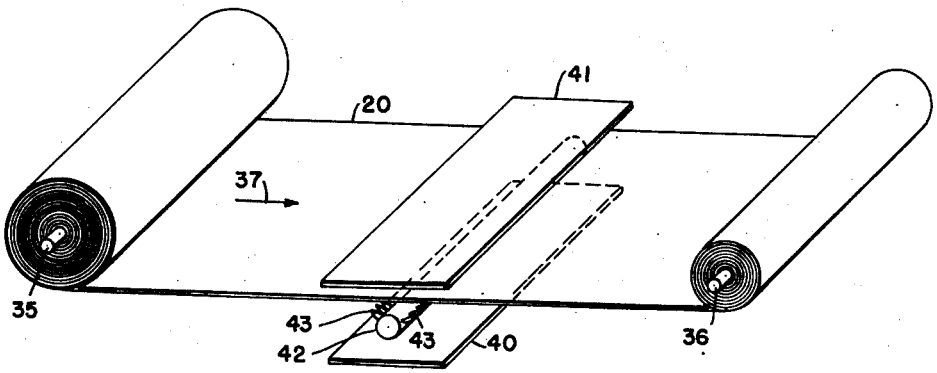
Figure 2 is a view of the apparatus for creating an electrical charge in the filter material to raise the fibers and to singe the projecting fibers.

The process for removing the matted fibers or nap 32 from the surface 30 is shown in Figure 2 and comprises a bolt of the material 20 rotatably supported on a shaft 35, and the material is wound onto a shaft 36 by moving the material in the direction of the arrow 37. The material passes through an electrostatic field formed by two electrodes 40 and 41 disposed on opposite sides of the material, and the electrodes are connected to a suitable source of high frequency current. Disposed above the electrode 40 and beneath the material 20 is a gas manifold 42 having two rows of burners 43—43 in the electrostatic field and adjacent the outer fibers of the material.

Movement of the material between the electrodes 40 and 41 causes the material to pass through the electrostatic field and the fibers receive an electrical charge and are aligned with the electric field, and as a result of such charge the nap or fibers are pulled away from and are perpendicular to the body of the material. While the fibers are raised from the body of the material, the burners 43—43 singe the ends of the fibers to shorten the latter and thus prevent the fibers from forming a matted surface, and the resulting surface shown at 45 in Figure 4 provides a relatively smooth dirt contacting surface from which the dirt may easily be removed when the filter is being cleaned.

The speed of movement of the material between the electrodes 40 and 41 depends upon the size of the electrodes, the strength of the electrostatic field and the heat of the singeing flame. I have found that the voltage applied to the electrodes can be varied over a wide range and have employed voltages from 1500 to 4000 per square inch. If desired the burners 43 can be arranged to one side of the electrodes 40 and 41.

Figure 4:
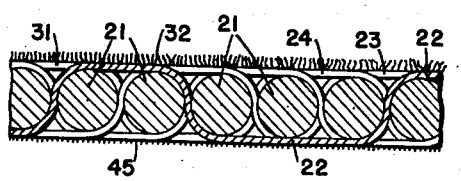
Figure 4 is a section of the filter material after the fibers have been shortened on the dirt contacting surface of the filter.

The processed filter material shown in Figure 4 is formed into the dirt filtering bag 16 with the smooth surface 45 forming the interior and the napped surface 31 the exterior of the bag. The dirt-laden air passes through the inlet 14 into the bag 16 and first contacts the smooth inner surface 45, and the remaining portion of the filter body removes the dirt from the dirt-laden air stream as the latter passes through the material, and the cleaned air is then discharged through the outlet 15.

In cleaning the bag 16, the end cap 14 and the bag 16 are removed and the dirt is easily dislodged from the bag because of the relatively smooth inner surface 45.

While I have shown and described but a single modification of my invention, it is to be understood that this modification is to be taken as illustrative only and not in a limiting sense. I do not wish to be limited to the particular structure and process shown and described, but to include all equivalent variations thereof except as limited by the scope of the claims.

I claim:

1. The method of shortening fibers in fibrous material which comprises applying an electrical charge to the material to raise fibers from the body of the material, and shortening the projecting fibers while charged to substantially the body of the material by a flame independent of said electrical charge.

2. The method of shortening fibers in fibrous material which comprises passing the material through an electric field to raise fibers from the body of the material, and shortening the projecting fibers while in said electric field to substantially the body of the material by a flame independent of said field.

3. The method of shortening fibers in fibrous material which comprises applying a high frequency current to the material to raise fibers from the body of the material, and shortening the projecting fibers in the high frequency current to substantially the body of the material by a flame independent of said high frequency current.

4. The method of treating a fibrous material for use as a dust filter which comprises passing the material through an electric field to raise fibers from the body of the material, and applying separate heat to the projecting fibers while in said electrical field to shorten the projecting fibers to substantially the body of the material.

5. The method of treating a fibrous material for use as a dust filter for suction cleaners which comprises raising fibers along one side of the body of the material by electrical means, and applying separate heat to the projecting fibers along said one side to shorten the fibers to substantially the body of the material.

6. Apparatus for shortening fibers in a fibrous material, comprising electrodes to create an electrical field for the material to raise the fibers from the body of the material, and means in the electrical field independent of the latter to singe the raised fibers to shorten the latter.

7. Apparatus for shortening fibers in a fibrous material, comprising electrodes arranged on opposite sides of the material to create an electrical field to raise the fibers from the body of the material, and singeing means independent of said electrodes disposed between one of said electrodes and the adjacent side of said material to singe the raised fibers to shorten the latter on said one side of said material.

8. The method of shortening fibers in fibrous material which comprises moving the material between electrodes to raise and project the fibers from the body of the material, and shortening the projected fibers independent of said electrodes to substantially the body of the material while moving the latter between said electrodes.

References Cited in the file of this patent

UNITED STATES PATENTS

| Number | Name | Date |
| --- | --- | --- |
| 1,726,678 | Osthoff | Sept. 3, 1929 |
| 2,385,873 | Melton | Oct. 2, 1945 |